Patented June 8, 1926.

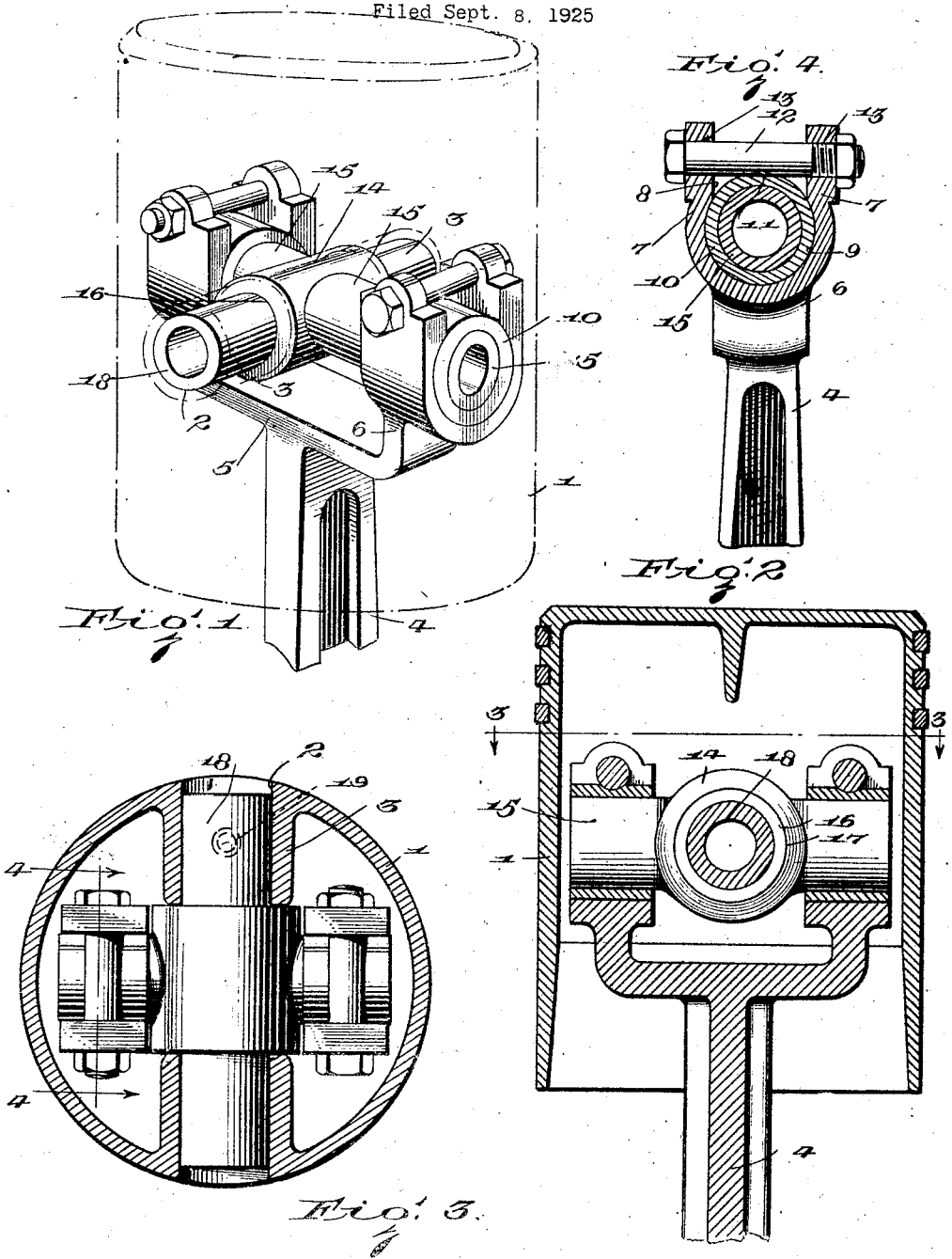

1,588,137

UNITED STATES PATENT OFFICE.

CHARLES ALBERT MYERS, OF TAMAQUA, PENNSYLVANIA.

CONNECTING ROD.

Application filed September 8, 1925. Serial No. 55,127.

My invention relates to improvements in connecting rods and it consists in the combinations, constructions and arrangements herein described and claimed.

An object of the invention is the provision of a connecting rod which is adapted to be connected with a piston in such manner that a universal connection is established between the connecting rod and the piston.

A further object of the invention is the provision of a connecting rod which is adapted to be connected in a simple and facile manner to the piston rod.

Other objects and advantages of the invention will be apparent from the following description, considered in conjunction with the accompanying drawings, in which:

Figure 1 is a schematic perspective view of the piston and connecting rod construction, Figure 2 is a longitudinal vertical section through the piston and connecting rod with the trunnion block of the connection shown in elevation, Figure 3 is a section along the line 3—3 of Fig. 2, and Figure 4 is a section along the line 4—4 of Fig. 3.

The numeral 1 designates a piston of the usual hollow construction and open at its lower end. The piston is formed with a pair of diametrically opposite openings 2 from which alined tubular bosses 3 extend radially inward toward the longitudinal center line of the piston but terminate short of the longitudinal center line of the piston, leaving a space of considerable width centrally of the piston between the inner ends of the bosses 3.

The connecting rod has a shank or body 4 formed with a substantially U-shaped head portion 5 having upwardly extending arms 6, each of which is formed with furcations 7 produced by slots 8 which extend at right angles to the direction of length of the space between the arms 6. The wall of each slot 8 is concavely curved at the lower end of the slot as indicated at 9 to provide a seat for a tubular bushing 10 which is circular in cross sectional inner and outer outlines.

The bushing 10 is provided intermediate its length with a transverse groove 11 in the upper part of the outer wall of the bushing 10. A retaining pin 12 is shown as being the shank of a bolt that extends through alined openings 13 in the upper end portions of the furcations 7, and engages the groove 11 to hold the bushing 10 against turning in the seat 9.

A trunnion block 14 has a pair of oppositely extending alined tubular trunnions 15 having the end portions thereof journalled in the bushings 16. The trunnion block also has a bore 16 extending at right angles to the axial line of the trunnions. A bushing 17 is secured in the bore 16. The inner diameter of the bushing 17 is approximately equal to the diameter of the bore of each of the bosses 3 and the connecting rod is adapted to be inserted in the piston until the block 14 is disposed between the inner ends of the bosses 3 with the ends of the bushing 17, close to the inner ends of the bosses 3 and in axial alinement with the latter.

A tubular pin 18 extends through the alined bores of the bosses 3 and the bushing 17, whereby the trunnion block will be pivotally attached to the piston.

From the foregoing description of the various parts of the device, the operation thereof may be readily understood. The connecting rod can swing relatively to the piston about axes which extend at right angles to each other and therefore no lateral stress on the piston will result from the reciprocation of the connecting rod. It of course will be understood that the lower end portion of the connecting rod will be adapted in any suitable known manner, not illustrated in the drawings, to be connected with a crank shaft, also not shown, so motion will be transmitted from the crank shaft through the connecting rod to the piston. Openings may be provided in the bosses 3 as at 19 and in any of the remaining tubular bearing members of the device to permit lubricant to be fed to the relatively moving surfaces of the device.

Obviously, the invention is susceptible of embodiment in forms other than that which is illustrated in the accompanying drawings, and I therefore consider as my own all such modifications and adaptations thereof as fairly fall within the scope of the appended claim.

I claim:

A connecting rod having a shank formed with a substantially U-shaped upper end portion, each of the arms of said U-shaped upper end portion being bifurcated by a vertical slot, the wall of the lower end portion of said slot being concavely curved, a bushing adapted to fit in said concavely curved portion of the slot, the bushing having a transverse groove in the upper portion of the peripheral wall thereof and the upper end portions of the furcations of said arm having alined openings, and a bolt having a shank extending through said openings and engaging said groove to hold said bushing against turning in said slot.

CHARLES ALBERT MYERS.